(12) United States Patent
Kageyama et al.

(10) Patent No.: US 6,246,837 B1
(45) Date of Patent: Jun. 12, 2001

(54) IMAGE SENSING APPARATUS

(75) Inventors: Kazumi Kageyama, Sakai; Shinichi Maehama; Kouji Nagano, both of Osaka; Kenji Nakamura, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 5 days.

(21) Appl. No.: 09/327,499

(22) Filed: Jun. 8, 1999

(30) Foreign Application Priority Data

Jun. 9, 1998 (JP) ................................ H10-160282

(51) Int. Cl.$^7$ .................................................. G03B 17/20
(52) U.S. Cl. ............................................ 396/287; 396/296
(58) Field of Search ............................ 396/287, 296, 396/281, 52, 53, 54, 55, 374, 233, 234; 348/333, 334

(56) References Cited

U.S. PATENT DOCUMENTS 5,060,007 * 10/1991 Egawa ..................................... 396/52
5,266,985 * 11/1993 Takagi ............................... 396/287 X

FOREIGN PATENT DOCUMENTS

| 8-29674 | 2/1996 | (JP) . |
| 08184890 | 7/1996 | (JP) . |

* cited by examiner

Primary Examiner—W. B. Perkey
(74) Attorney, Agent, or Firm—Burns, Doane, Swecker & Mathis, LLP

(57) ABSTRACT

An image sensing apparatus invention has an image sensing device for sensing a subject image from a range which is wider than a photographic range, a processor for calculating position information of a subject with respect to the photographic range based on an output from the image sensing device, a discriminator for determining whether photographing is appropriately performed or not, based on information calculated by the processor, and a notifier for notifying a result of determination by the discriminator before photographing. In this structure, appropriate photographing can be performed by referring to the notifying contents of the notifier.

19 Claims, 8 Drawing Sheets

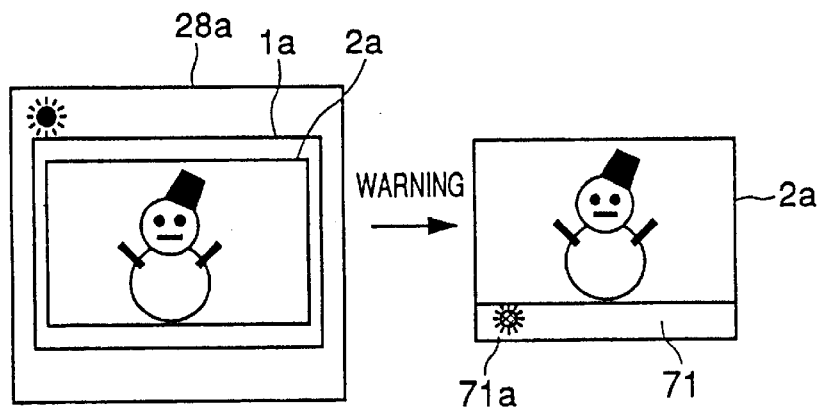
FIG. 9(a)  FIG. 9(b)
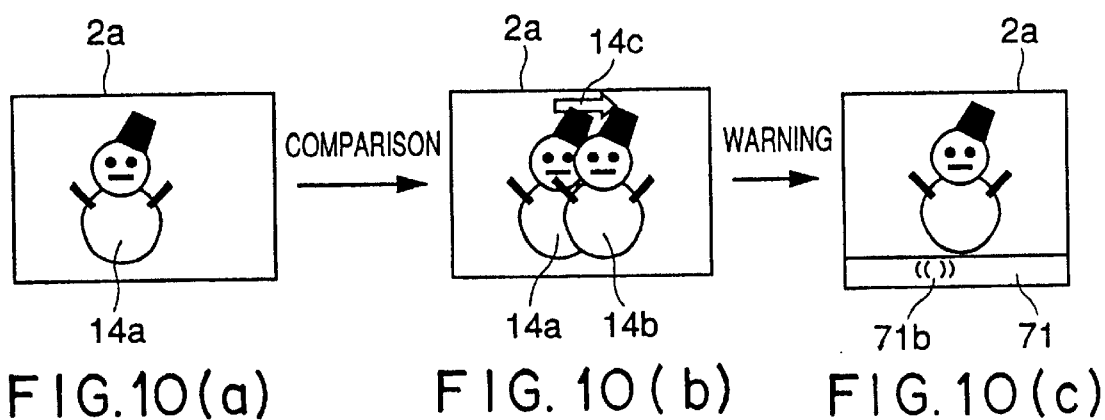
FIG. 10(a)  FIG. 10(b)  FIG. 10(c)
FIG. 11
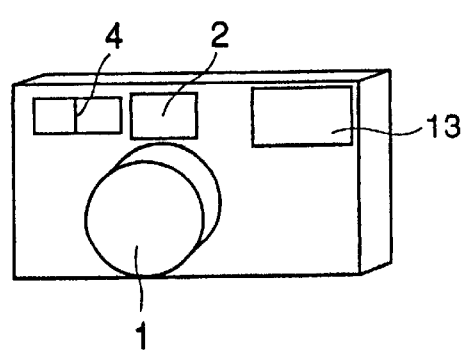

IMAGE SENSING APPARATUS

This application is based on application No. H10-160282 filed in Japan, the contents of which are hereby incorporated by reference.

BACKGROUND OF THE INVENTION

1. Field of the Invention

The present invention relates to an image sensing apparatus for sensing a subject image.

2. Description of the Prior Art

When taking a picture with a camera, the photographer performs framing before releasing the shutter. Framing is important because the quality of the taken picture largely depends on whether framing is appropriately made or not.

At a normal photographing distance, since the area within the finder field frame is always taken on the film, the photographic range is decided with reference to the finder field frame. In short-range photographing, the photographic range is decided with reference to a parallax correction frame provided in the finder. The parallax correction frame is provided for correcting the parallax amount which increases in short-range photographing. In addition to such a camera, a camera is known which is, although high in cost, structured so that the parallax correction frame moves in accordance with the distance measurement result. In this camera, the photographic range is decided with reference to the correction frame that moves.

It is also important in framing to set a composition where the subject is not backlighted. However, more and more cameras have recently been designed so as to compensate for exposure by detecting that the subject is backlighted. Therefore, it has become unnecessary for the photographer to be aware of the position of the sun.

As a cause of failure in releasing the shutter, camera shake is considered. Cameras embodying various ideas to prevent camera shake have previously been known. For example, there is a camera having a function of compensating for camera shake by moving the optical system in accordance with the camera shake amount. According to such a camera, failures caused by camera shake can be reduced although this camera is large in size and high is cost.

However, even in cameras embodying various ideas as described above, taken pictures can be failures. The following are examples of causes of such failures: A beginner sometimes takes pictures without noticing that a part of the subject is situated outside the field frame. In the case of a single-lens reflex camera, although no parallax is caused, there are cases where the photographer does not notice that a part of the subject is situated outside because his or her attention is caught by other operations.

When photographing is performed in a macro mode with a camera having a macro mode capable of short-range photographing at a photographing distance of 40 to 50 cm, although the camera has a parallax correction frame for the macro mode, there are cases where the photographer forgets the presence of the correction frame during photographing and an upper part of the subject (in the case of photographing in landscape orientation) is situated outside. With respect to the lower part of the subject, although even a part not seen in the finder is included in the photographic range, there is no means for confirming it and the photographer cannot help but depend on experience. Consequently, there are cases where the photographer cannot set a composition which he or she desires.

Even if a camera shake compensating function is provided, since this function is limited, the taken pictures can be blurred according to photographing conditions. For example, when a child is photographed, if the child moves when the shutter is released, the taken picture is a failure according to the shutter speed. Further, zoom lens systems have recently become the norm, and particularly, on the telephoto side in compact cameras, the F number of the lens increases and the shutter speed is controlled so as to increase the exposure time, so that the possibility that the taken picture is blurred is high.

Moreover, the backlight correction is also limited. Correction cannot be made when a bright point light source is present within the photographic range and when a light source is situated outside in the vicinity of the finder field, so that there are cases that flare is caused in the taken picture. In the case of compact cameras, since the taking lens and the finder optical system are different, it is difficult to grasp how much the influence of backlight is, so that there are cases where the taken picture is a failure. Since whether the taken picture is failure or not cannot be found until the picture is developed and printed, it is impossible to photograph the subject again on the spot.

SUMMARY OF THE INVENTION

In view of the above-mentioned problem, an object of the present invention is to provide an image sensing apparatus in which failures in framing are reduced, further, an image sensing apparatus in which when failing in photographing, the photographer notices the failure immediately after the photographing.

To achieve the above-mentioned object, an image sensing apparatus of the present invention has an image sensing device for sensing a subject image from a range being wider than a photographic range, a processor for calculating position information of a subject with respect to the photographic range based on an output from the image sensing device, a discriminator for determining whether photographing is appropriately performed or not, based on information calculated by the processor, and a notifier for notifying a result of determination by the discriminator before photographing.

Moreover, an image sensing apparatus of the present invention has a taking lens, a finder optical system having an optical axis being different from that of the taking lens, an image sensing device for sensing a subject image, a processor for calculating information on parallax based on an output from the image sensing device, a discriminator for determining whether photographing is appropriately performed or not, based on information calculated by the processor, and a notifier for notifying a result of determination by the discriminator before photographing.

Moreover, an image sensing apparatus of the present invention has an image sensing device for sensing a subject image, a detector for detecting a subject distance based on an output from the image sensing device, a processor for calculating position information of a subject based on a result of detection by the detector, a discriminator for determining whether photographing is appropriately performed or not, based on information calculated by the processor, and a notifier for notifying a result of determination by the discriminator before photographing.

Moreover, an image sensing apparatus of the present invention has an image sensing device for sensing a subject image, a memory for storing therein image data before photographing and image data after photographing by the image sensing device, a comparator for comparing the image data before photographing and the image data after photographing stored in the memory, a discriminator for determining whether photographing was appropriately performed or not, based on a result of comparison by the comparator, and a notifier for notifying a result of determination of the discriminator after photographing.

BRIEF DESCRIPTION OF THE DRAWINGS

This and other objects and features of this invention will become clear from the following description, taken in conjunction with the preferred embodiments with reference to the accompanying drawings in which:

FIGS. 9a–b are views showing a manner of warning that flare is caused in the first embodiment;

FIGS. 10a–c are views showing a manner of warning that blur is caused in the first embodiment;

FIG. 11 is a view showing an exterior of a camera in a second embodiment;

DESCRIPTION OF THE PREFERRED EMBODIMENTS

Figure 1:
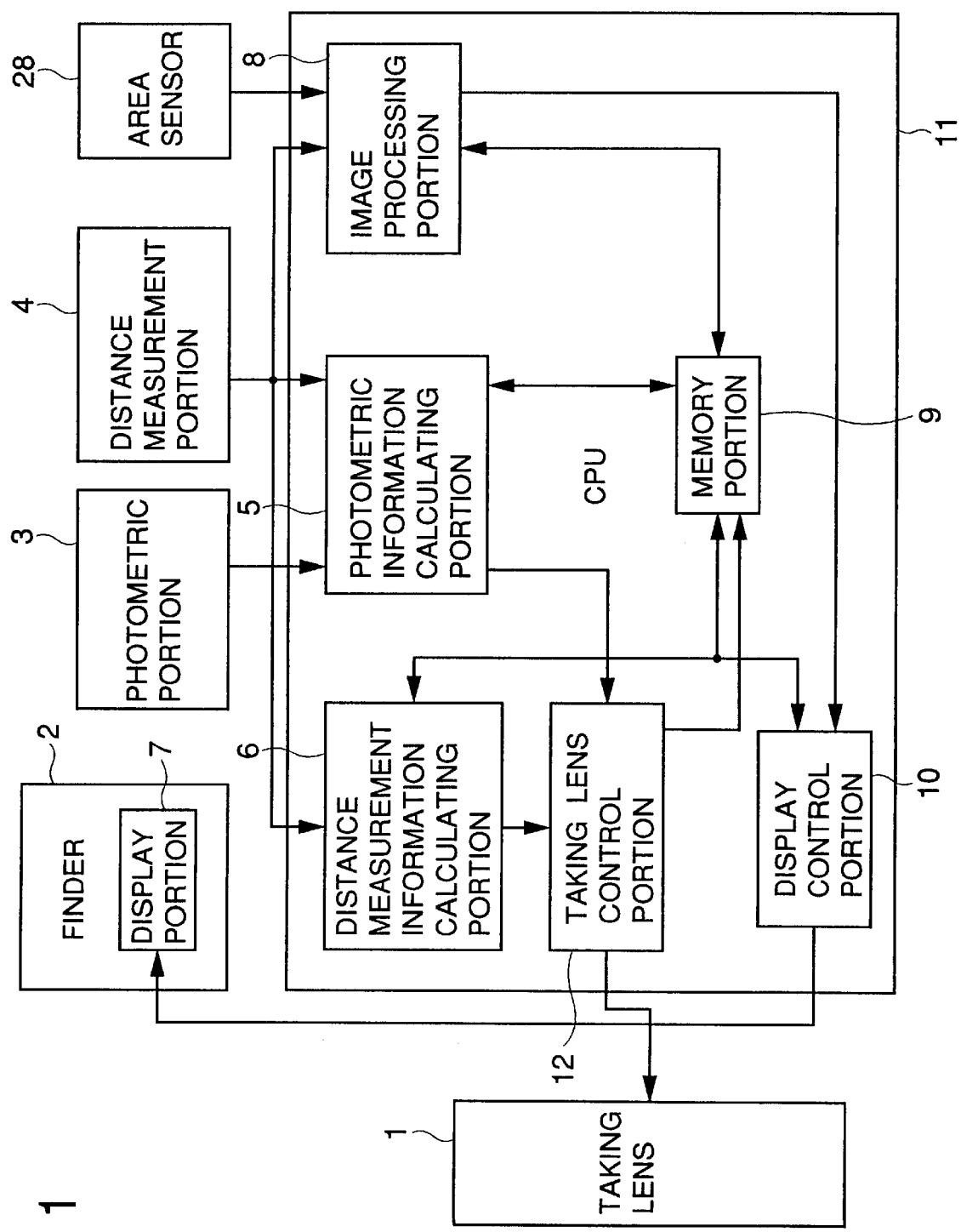
FIG. 1 is a block diagram schematically showing the structure of a camera of this embodiment.

FIG. 1 is a block diagram briefly showing the structure of an image sensing apparatus according to an embodiment of the present invention. The image sensing apparatus of this embodiment is a camera. When the shutter button is depressed, light incident through a taking lens 1 is recorded onto the film by a non-illustrated image forming portion (photographing). The subject can be viewed through a finder 2. The viewer performs framing while looking through a sight window provided in the finder 2. A photometric portion 3 detects the quantity of the incident light from the subject by a light receiving device.

A distance measurement portion 4 comprising a pair of area sensors described later splits the light incident from the direction of the subject into two parts and images each part of the light onto the corresponding area sensor. The pair of area sensors convert the received image into electric signals. The distance measurement portion 4 calculates the distance measurement data based on the electric signals.

An area sensor 28 receives the light incident from the direction of the subject and converts the received image into electric signals. When a sufficient range of image including the photographic range can be received by the area sensors of the distance measurement portion 4, it is unnecessary to provide the area sensor 28 in addition to the area sensors. When the area sensor 28 is provided, since it is necessary for the distance measurement portion 4 to be capable of calculating only distance measurement data, a pair of line sensors may be provided instead of the pair of area sensors.

A photometric information calculating portion 5 calculates appropriate aperture value and shutter speed based on the result of the detection by the photometric portion 3. While the photometric portion 3 and the distance measurement portion 4 are separately provided in this embodiment, the distance measurement portion 4 may be used also as the photometric portion. In this case, the photometric information calculating portion 5 calculates the data based on the result of the detection by the distance measurement portion 4.

A distance measurement information calculating portion 6 calculates an appropriate position of the taking lens 1 based on the distance measurement data of the distance measurement portion 4. A taking lens control portion 12 controls the position of the taking lens and the aperture value and the shutter speed at the time of photographing based on the data calculated by the photometric information calculating portion 5 and the distance measurement information calculating portion 6 to perform automatic focus detection and automatic exposure compensation.

An image processing portion 8 first captures image data obtained by the distance measurement portion 4 or the area sensor 28. Then, based on the image data, when the shutter button is depressed under the condition at that time, the image processing portion 8 determines whether the size and the position of the subject in the actual image plane (photographic range) are appropriate or not (framing determination) and whether there is a possibility that flare is caused in the taking optical system or not (flare determination). When the size and the position are not appropriate and when there is a possibility that flare is caused, data to notify the photographer of that are transmitted to a display control portion 10. The captured image data are transmitted to a memory portion 9 and stored therein.

After photographing is finished, the image processing portion 8 compares the image data when the shutter is open and the image data when the shutter is closed based on the data stored in the memory portion 9, and determines whether or not the taken image is blurred by a predetermined amount or more (blur determination). When it is determined that the taken image is blurred, data to notify the photographer of that are transmitted to the display control portion 10.

The photometric information calculating portion 5, the distance measurement information calculating portion 6, the image processing portion 8, the taking lens control portion 12, the display control portion 10 and the memory portion 9 are formed in a CPU 11 in the camera. The data calculated by these portions or the data necessary for the calculation are all stored in the memory portion 9. These portions read out necessary data from the memory portion 9 whenever necessary.

Based on the transmitted data, the display control portion 10 controls the display of a display portion 7 in the finder 2.

Figure 2:
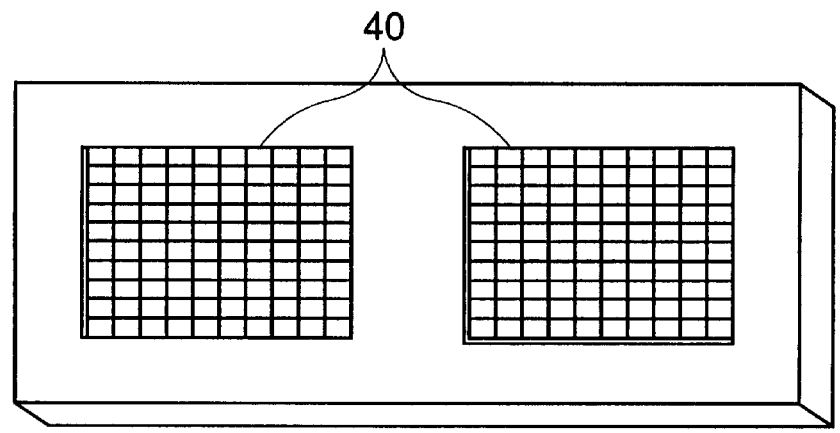
FIG. 2 is a schematic view of a pair of area sensors.

FIG. 2 is a view schematically showing the area sensors of the distance measurement portion 4. The distance measurement portion 4 has a pair of left and right area sensors 40. The light incident on the distance measurement portion 4 is split into two parts and applied to the area sensors. At each area sensor, the incident light is converted into electric signals. The distance measurement data are calculated by the phase difference detection method based on the electric signals obtained by the two area sensors 40. When the area sensor 28 is not provided, the image data obtained by at least one of the two area sensors 40 are transmitted to the image processing portion 8.

It is assumed that the detection range of the image detected by the area sensors 40 or the area sensor 28 includes or substantially includes the photographic range of the image taken by the taking lens 1, and is larger than the photographic range.

Figure 3:
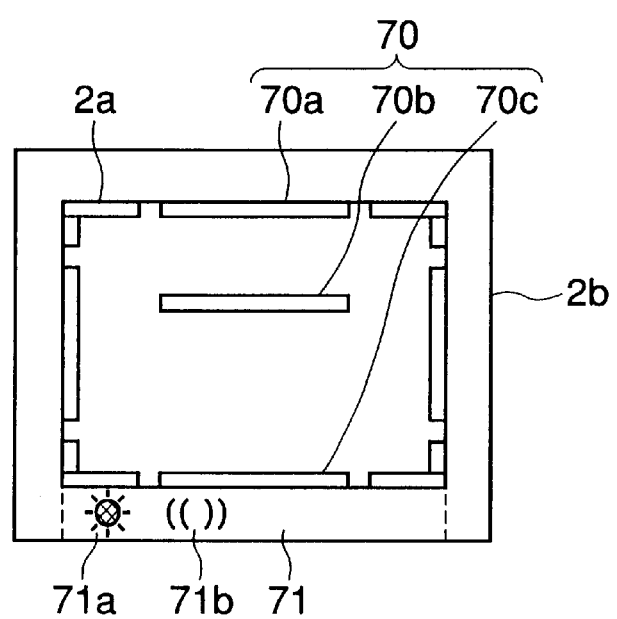
FIG. 3 is a view showing the field of view in the finder.

FIG. 3 is a view schematically showing the field of view through a sight window 2b of the finder 2. The finder 2 has a field frame 2a showing the range of the actual image plane. The field frame 2a comprises a light image frame. In order that everything seen in the field frame 2a is taken onto the film, the field frame 2a is smaller than the actual image plane.

Reference numeral 71 represents a liquid crystal display portion disposed below the field frame 2a. When it is determined in the flare determination that there is a possibility that flare is caused, a flare mark 71a is displayed. When it is determined in the blur determination that the taken image is blurred by the predetermined amount or more, a blur mark 71b is displayed. Reference numeral 70 represents a framing determination display portion disposed in the field frame 2a. The display portion 70 comprises a plurality of line-form indicators such as an upper central indicator 70a, a central indicator 70b and a lower central indicator 70c. These indicators are blinked or lit up.

The framing determination display portion 70 may have any configuration as long as a line-form image is viewed by the viewer at the time of display. For example, the framing determination display portion 70 may have a configuration such that a transmissive LCD is disposed in the same position as the light image frame of the field frame 2a. In this configuration, by controlling the LCD so as to be switched between the transmitted condition and the un-transmitted condition, a line-form image in the display portion 70 is viewed or is not viewed in the viewer's field of view. It is assumed that the condition where the image is viewed is the displayed condition. The display portion 7 comprises the LCD display portion 71 and the framing determination display portion 70.

Hereinafter, the framing determination, the flare determination and the blur determination, and the display controls based on the results of these determinations will concretely be described with reference to the drawings. Of the camera of FIG. 1, a camera in which the optical system of the taking lens 1 and the optical system of the distance measurement portion 4 are the same like a single-lens reflex camera will be referred to as a camera of the first embodiment, and a camera in which the optical systems are different will be referred to as a camera of the second embodiment. Both of these cameras will be described.

Figure 16:
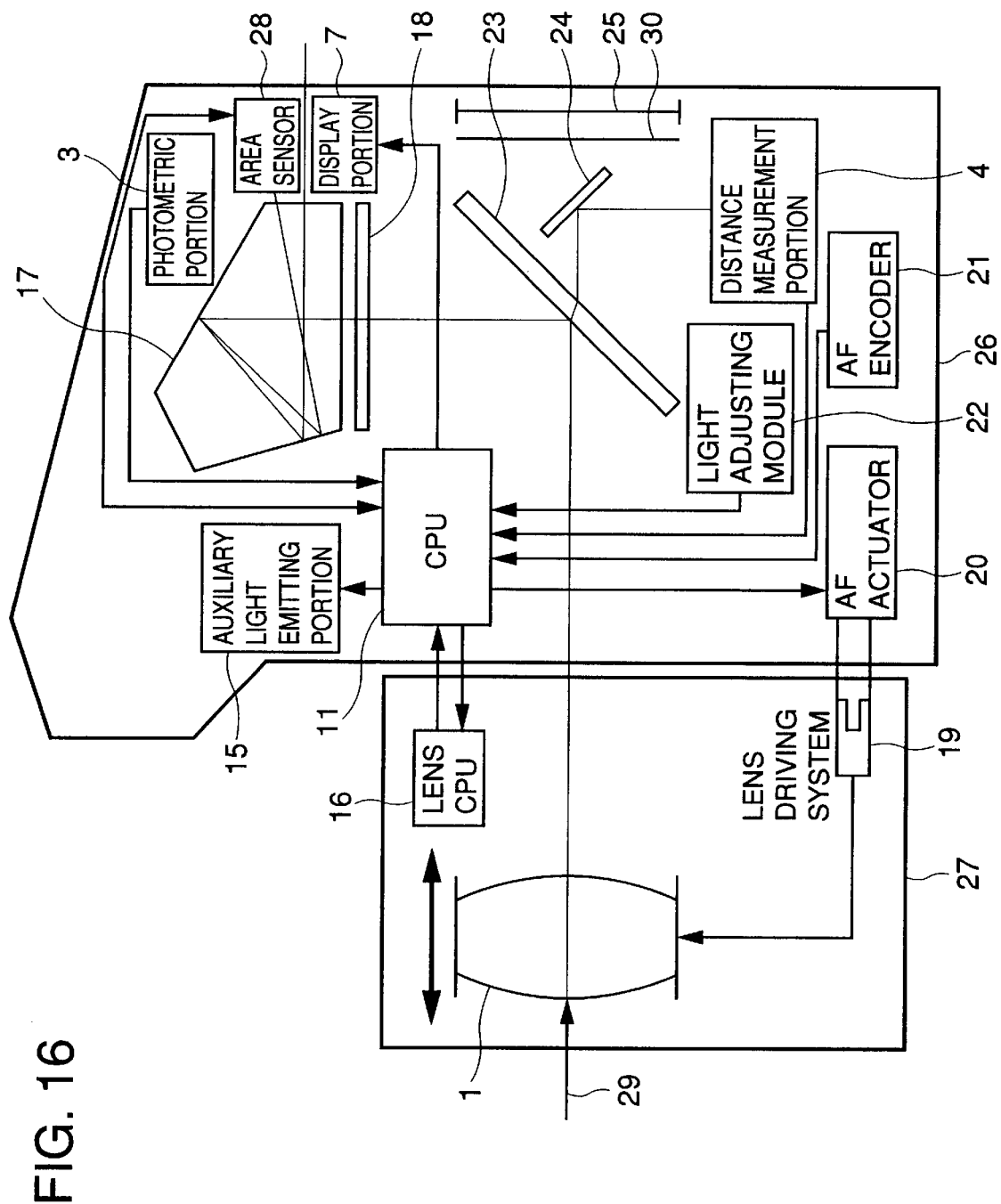
FIG. 16 is a block diagram of a camera of the first embodiment.

First, an example of the camera of the first embodiment will be shown. FIG. 16 is a block diagram of a single-lens reflex camera according to this embodiment. A taking lens portion 27 is attached to the front surface of a camera body 26. The taking lens 1 is disposed on the optical axis 29. In the rear of the taking lens 1, a main mirror 23 is disposed so as to face upward at 45 degrees. In the rear of the main mirror 23, a film exposure plane 25 is disposed. At least a part of the main mirror 23 is a half mirror.

Between the half mirror part of the main mirror 23 and the film exposure plane 25, a sub mirror 24 whose rotation axis is attached to the rear surface of the main mirror 23 is disposed so as to face downward at 45 degrees. The sub mirror 24 reflects the distance measurement luminous flux transmitted by the half mirror part of the main mirror 23, and directs it to the distance measurement portion 4 disposed below the mirror box of the camera body.

At the time of photographing, the main mirror 23 and the sub mirror 24 are rotated upward so as to retreat from the optical axis 29, and the photographing luminous flux having passed through the taking lens 1 is imaged on the film exposure plane 25. Reference numeral 30 represents the shutter.

A focusing screen 18 and a pentagonal roof prism 17 are formed above the main mirror 23. The light reflected upward at the main mirror 23 is imaged on the focusing screen 18. The user of the camera can view the image on the focusing screen 18 through the pentagonal roof prism 17. In the camera of this embodiment, the light having passed through the pentagonal roof prism 17 is also supplied to the area sensor 28. Therefore, in this embodiment, the image data formed by the area sensor 28 in FIG. 1 are transmitted to the image processing portion 8, and the image processing portion 8 performs various processes by use of the data.

An auxiliary light emitting portion 15 emits light when distance measurement is impossible because of low subject brightness and low contrast based on an instruction from the CPU 11. A light adjusting module 22 adjusts the light emission amount of a non-illustrated flash portion.

In a lens CPU 16, lens information is stored. Of the information, information necessary for automatic focus detection control and automatic exposure compensation is supplied to the CPU 11. An instruction from the lens control portion 12 (see FIG. 1) of the CPU 11 is transmitted to an AF actuator 20 which drives the motor for driving the taking lens 1. An AF encoder 21 converts the number of revolutions of the motor into a signal in order to control the number of revolutions. This signal is transmitted to the CPU 11. Monitoring this signal, the CPU 11 controls the number of revolutions of the AF motor.

The revolution of the AF motor is transmitted from the body side 26 to the lens side 27 by a lens driving system 19, and the lens 1 is driven to complete focusing. The structure other than this will not be described because it has been described with reference to FIG. 1.

Figure 4:
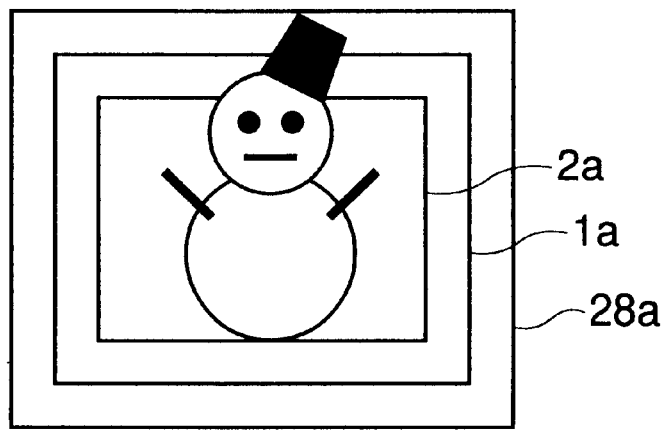
FIG. 4 is a view showing the relationship among a field frame, a photographic range and an area sensor range in a first embodiment.

FIG. 4 shows the relationship among the field frame 2a, the photographic range (actual image plane) 1a and the area sensor range 28a (image detection range of the area sensor 28). As mentioned previously, the field frame 2a is smaller than the photographic range 1a.

Figure 5:
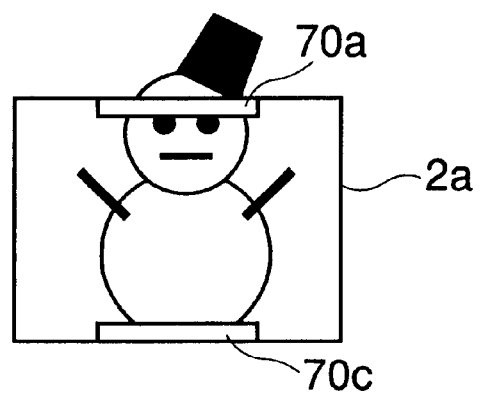
FIG. 5 is a view showing a manner of range display in the first embodiment.

Immediately after the photographer looks through the finder 2, the upper central indicator 70a and the lower central indicator 70c light up as shown in FIG. 5 so that the photographer clearly recognizes the field frame 2a. The field frame 2a which is viewed as a light image frame can be recognized by a careful view. However, the field frame 2a is difficult to recognize in some light conditions because it is a thin line. By lighting the indicators 70a and 70c, the viewer can clearly recognize the field frame 2a.

Figure 6:
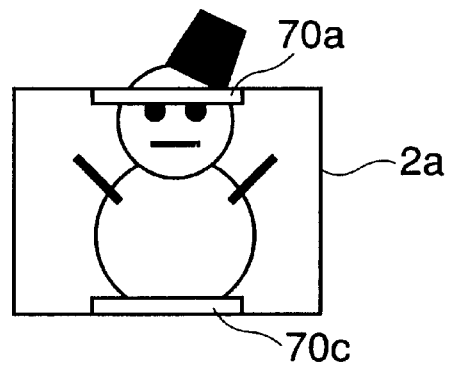
FIG. 6 is a view showing a manner of warning that the subject is too large in the first embodiment.
Figure 7:
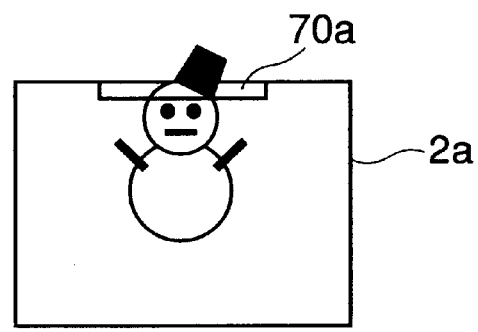
FIG. 7 is a view showing a manner of warning that a part of the subject is situated outside in the first embodiment.

When it is determined in the framing determination that the subject is too large to fall within the photographic range 1a, the upper central indicator 70a and the lower central indicator 70c are blinked as shown in FIG. 6 to thereby warn the photographer that the subject is too large. Warning is also provided when there is a problem with the position of the subject although there is no problem with the size of the subject. For example, when an upper part of the subject is situated outside the photographic range 1a, the upper central indicator 70a is blinked as shown in FIG. 7 to thereby warn the photographer that the upper part is situated outside.

Since the field frame 2a is smaller than the photographic range 1a, when a part of the subject is situated outside the field frame 2a, it is difficult to determine whether the subject is included in the photographic range 1a or not. By providing the warnings as described above, the photographer can easily perform framing and failures due to framing such that a part of the subject is situated outside can be prevented.

Figure 8:
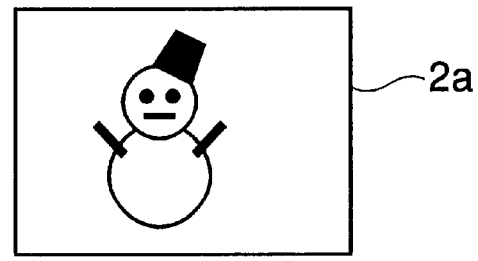
FIG. 8 is a view showing a condition where framing is appropriately made in the first embodiment.

In any of the displays, the indicator is turned off when framing is made so that the subject is of an appropriate size and situated in an appropriate position as shown in FIG. 8.

FIG. 9 shows an example for explaining the flare determination and the display control based on the flare determination in the camera of the first embodiment. When a high-brightness light source such as the sun is detected in the area sensor range 28a as shown in (a) of FIG. 9, it is determined in the flare determination that the possibility that flare is caused in the taking optical system is high since a high-brightness light source is situated in the vicinity of or inside the photographic view angle. By the display control based on the determination result, the flare mark 71a is displayed in the liquid crystal display portion 71 as shown in (b) of FIG. 9. In response to the warning, the photographer can set a more appropriate photographic range by performing framing again.

In the flare determination, the structure such that the area sensor range 28a is larger than the photographic range 1a like in this embodiment is particularly effective. With this structure, even when a high-brightness light source is situated in the vicinity of the photographic view angle as shown in (a) of FIG. 9, the light source can be detected.

FIG. 10 shows an example for explaining the blur determination and the display control based on the blur determination in the camera of the first embodiment. To perform the blur determination, the position of a subject image 14a obtained from the image data of the area sensor 28 when the shutter is open (a) is compared with the position of a subject image 14b obtained from the image data of the area sensor 28 when the shutter is closed (b), and it is determined whether or not the shift amount 14c between the two images 14a and 14b is a predetermined value or larger. When the shift amount 14c is the predetermined value or larger, it is determined that blur is caused. By the display control based on the determination result, the blur mark 71b is displayed in the liquid crystal display portion 71 as shown in (c).

This warning is very effective since the photographer can photograph the subject again in response to the warning. If the warning that blur is caused is not provided, it is only after the picture is developed and printed that the photographer finds that blur occurred, and at that time, it is impossible for the photographer to photograph the subject again.

Subsequently, an example of the camera of the second embodiment will be described. FIG. 11 briefly shows an exterior of the camera of the second embodiment. On the taking lens 1, the distance measurement portion 4 and the finder 2, light is incident through different optical systems. In addition, a flash 13 is formed. In the camera of this embodiment, the area sensor 28 in the block diagram of FIG. 1 is not provided. Therefore, in the image processing portion 8, processing is performed based on the image data detected by the area sensors 40 of the distance measurement portion 4.

Figure 12:
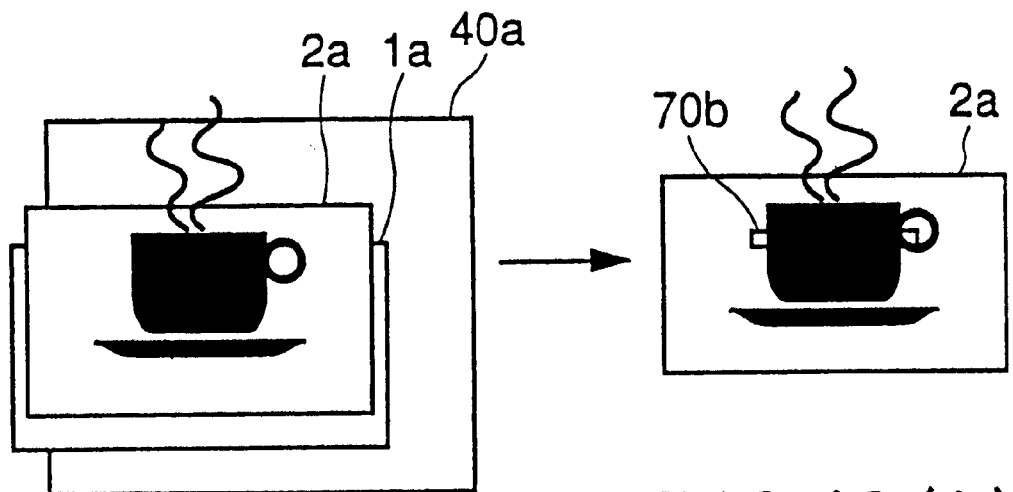
FIGS. 12a–b are views showing a manner of warning that an upper part of the subject is situated outside in the second embodiment.

(a) of FIG. 12 shows an example of the relationship among the field frame 2a, the photographic range 1a and the area sensor range 40a (image detection range of the area sensors 40) in the camera shown in FIG. 11. Since light is incident on the taking lens 1, the distance measurement portion 4 and the finder 2 through different optical systems in the camera of this embodiment, the centers of the area sensor range 40a, the field frame 2a and the photographic range 1a do not coincide. In the field frame 2a and the photographic range 1a, a parallax which differs according to the subject distance is caused.

When a subject being a short distance away is photographed, if framing is performed without consideration of parallax, it can happen that the subject does not fall within the photographic range 1a although being situated within the field frame 2a as shown in (a) of FIG. 12. In this case, it is determined in the framing determination that an upper part is situated outside. By the display control based on the determination result, the central indicator 70b coinciding with the upper limit of the photographic range 1a is blinked as shown in (b) of FIG. 12.

Figure 13:
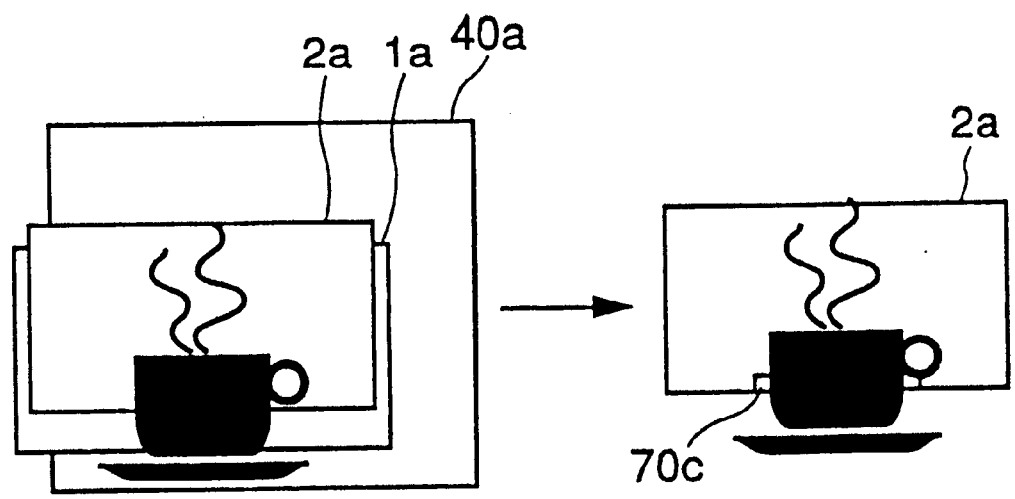
FIGS. 13a–b are views showing a manner of warning that a lower part of the subject is situated outside in the second embodiment.

Moreover, it can happen that although parallax is considered, the prediction of the parallax amount is erroneous and a lower part is situated outside the photographic range 1a as shown in (a) of FIG. 13. In this case, it is determined in the framing determination that a lower part is situated outside. By the display control based on the determination result, the lower central indicator 70c is blinked.

By the above-described control, failure of framing can be prevented even when there is a large parallax. When a subject not being a short distance away is photographed, a warning is provided in a similar manner. The flare warning and the blur detection display are provided like in the first embodiment.

While examples of control in the first and the second embodiments have been shown, it is desirable that various warnings be provided by controlling the indicators of the framing determination display portion 70. Although it is desirable for the photographer to remember the meanings of the displays, since the contents of warnings and the positions of the displays correspond to each other, the photographer can visually recognize the meanings even if he or she does not remember them. Since the indicator is turned off when an appropriate framing is made, framing is performed by moving the field of view until the indicator is turned off.

Figure 14:
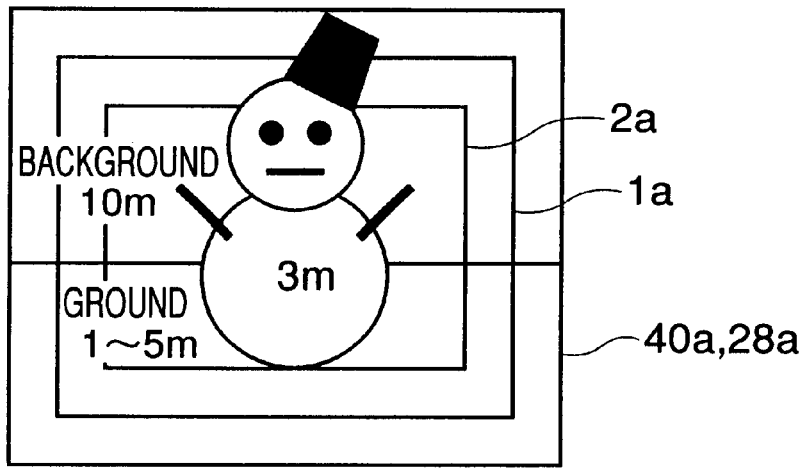
FIG. 14 is a view showing a condition of a subject for explaining framing determination.
Figure 15:
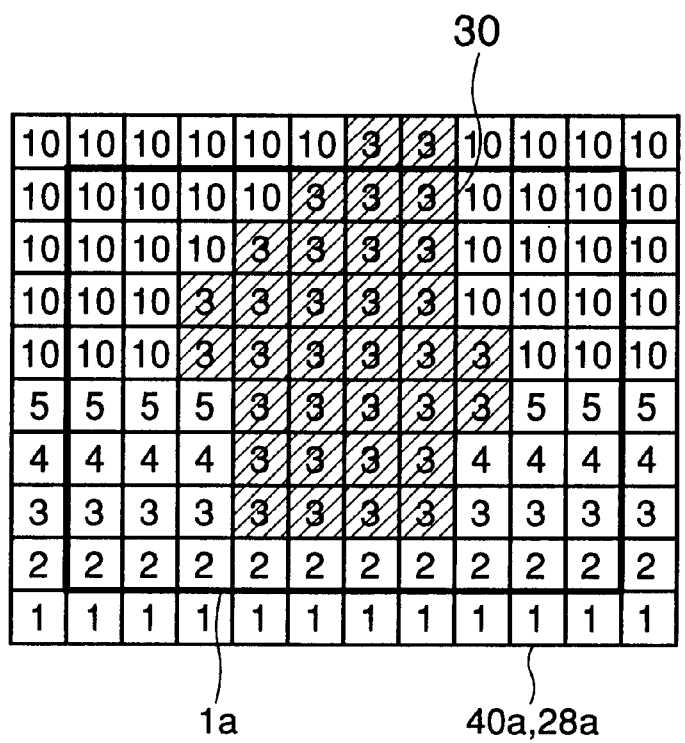
FIG. 15 is a view showing the distance distribution data of each pixel of the area sensor for explaining the framing determination.

Subsequently, a detailed processing method of the framing determination will be described with reference to FIGS. 14 and 15. It is assumed that a framing as shown in FIG. 14 is made. The photographic range 1a which varies according to the subject distance is not decided until the framing determination is performed.

The area sensors 40 or the area sensor 28 comprises a plurality of photoelectrically converting elements each corresponding to a pixel. The distance distribution data of each pixel are obtained by the phase difference detection method based on the image data of the area sensor. FIG. 15 shows the distance distribution data. The numbers in the pixels are distance data. The object configuration is grasped by overlaying the image data on the distance distribution data. In FIG. 15, the object configuration of the main subject is determined to be a configuration as shown by the hatched area 30.

The above-described data are transmitted from the distance measurement portion 4 or the area sensor 28 to the image processing portion 8. The image processing portion 8 estimates the photographic range 1a based on the distance to the main subject, and calculates whether a part of the main subject is situated outside the photographic range 1a or not and whether the main subject is of the size that falls within the photographic range 1a or not. In this case, since the subject is too large, a warning as shown in FIG. 6 is provided.

While in this embodiment, the photographer is provided with information effective in framing, information to notify the photographer of the possibility that flare is caused and information to notify the photographer that blur is caused by the indicators of the display portion 7, the notifier is not limited to indicators. For example, sounds may be used to provide the photographer with various kinds of information.

Obviously, many modifications and variations of the present invention are possible in light of the above teachings. It is therefore to be understood that within the scope of the appended claims, the invention may be practiced other than as specifically described.

What is claimed is:

1. An image sensing apparatus comprising:
   an image sensing device for sensing a subject image from a range which is wider than a photographic range;
   a processor for calculating position information of a subject with respect to said photographic range based on an output from said image sensing device;
   a discriminator for determining whether photographing is appropriately performed, based on information calculated by said processor; and
   a notifier for notifying a result of determination by said discriminator before photographing.

2. An image sensing apparatus as claimed in claim 1, wherein said image sensing device is an area sensor.

3. An image sensing apparatus as claimed in claim 1, wherein said discriminator determines whether one of a position and a size of the subject with respect to said photographic range is appropriate.

4. An image sensing apparatus as claimed in claim 1, wherein said discriminator determines whether there is a possibility that flare is caused.

5. An image sensing apparatus as claimed in claim 1, wherein said notifier changes a notification form based on a result of determination by said discriminator.

6. An image sensing apparatus as claimed in claim 1, wherein said image sensing apparatus further comprises a finder, and wherein said notifier provides a display on a display in said finder.

7. An image sensing apparatus comprising:
   a taking lens;
   a finder optical system having an optical axis which is different from that of said taking lens;
   an image sensing device for sensing a subject image from a range which is wider than a photographic range;
   a processor for calculating parallax information based on an output from said image sensing device;
   a discriminator for determining whether photographing is appropriated performed, based on the parallax information calculated by said processor; and
   a notifier for notifying a result of determination by said discriminator before photographing.

8. An image sensing apparatus as claimed in claim 7, wherein said image sensing device is an area sensor.

9. An image sensing apparatus as claimed in claim 7, wherein said discriminator determines whether a position of a subject with respect to a photographic range is appropriate.

10. An image sensing apparatus as claimed in claim 7, wherein said notifier changes a notification form based on a result of determination by said discriminator.

11. An image sensing apparatus as claimed in claim 7, wherein said notifier provides an indication on a display in said finder.

12. An image sensing apparatus comprising:
    an image sensing device for sensing a subject image which is wider than a photographic range;
    a detector for detecting a subject distance based on an output from said image sensing device;
    a processor for calculating position information of a subject based on a result of detection by said detector;
    a discriminator for determining whether photographing is appropriated performed, based on information calculated by said processor; and
    a notifier for notifying a result of determination by said discriminator before photographing.

13. An image sensing apparatus as claimed in claim 12, wherein said image sensing device is an area sensor.

14. An image sensing apparatus as claimed in claim 12, wherein said discriminator determines whether one of a position and a size of the subject with respect to a photographic range is appropriate.

15. An image sensing apparatus as claimed in claim 12, wherein said notifier changes a notification form based on a result of determination by said discriminator.

16. An image sensing apparatus as claimed in claim 12, wherein said image sensing apparatus further comprises a finder, and wherein said notifier provides an indication on a display in said finder.

17. An image sensing apparatus comprising:
    an image sensing device for sensing a subject image both inside and outside a photographic range;
    a processor for calculating position information of a subject with respect to said photographic range based on an output from said image sensing device;
    a discriminator for determining whether photographing is appropriately performed, based on information calculated by said processor; and
    a notifier for notifying a result of determination by said discriminator before photographing.

18. An image sensing apparatus comprising:
    a taking lens;
    a finder optical system having an optical axis which is different from that of said taking lens;
    an image sensing device for sensing a subject image both inside and outside a photographic range;

a processor for calculating parallax information based on an output from said image sensing device;

a discriminator for determining whether photographing is appropriated performed, based on the parallax information calculated by said processor; and a notifier for notifying a result of determination by said discriminator before photographing.

19. An image sensing apparatus comprising:

an image sensing device for sensing a subject image both inside and outside a photographic range;

a detector for detecting a subject distance based on an output from said image sensing device;

a processor for calculating position information of a subject based on a result of detection by said detector;

a discriminator for determining whether photographing is appropriated performed, based on information calculated by said processor; and a notifier for notifying a result of determination by said discriminator before photographing.

* * * * *